United States Patent
Gribble et al.

(10) Patent No.: US 12,084,071 B1
(45) Date of Patent: Sep. 10, 2024

(54) SIMULATION STABILITY ANALYSES BASED ON PARAMETER PERTURBATION

(71) Applicant: Zoox, Inc., Foster City, CA (US)

(72) Inventors: Joseph Gribble, Foster City, CA (US); Peter Scott Schleede, Foster City, CA (US)

(73) Assignee: Zoox, Inc., Foster City, CA (US)

(*) Notice: Subject to any disclaimer, the term of this patent is extended or adjusted under 35 U.S.C. 154(b) by 527 days.

(21) Appl. No.: 17/131,559

(22) Filed: Dec. 22, 2020

(51) Int. Cl.
  B60W 50/06 (2006.01)
  G06F 11/34 (2006.01)
(52) U.S. Cl.
  CPC ......... B60W 50/06 (2013.01); G06F 11/3457 (2013.01)
(58) Field of Classification Search
  CPC .......................... B60W 50/06; G06F 11/3457
  See application file for complete search history.

(56) References Cited

U.S. PATENT DOCUMENTS

| | | | | |
|---|---|---|---|---|
| 2019/0235521 A1* | 8/2019 | Mudalige | ............ | G05D 1/0248 |
| 2020/0097004 A1* | 3/2020 | Whittaker | ............ | B60W 40/04 |
| 2020/0117492 A1* | 4/2020 | Natarajan | ............ | G06F 11/3457 |
| 2020/0130709 A1* | 4/2020 | Rodionova | ............ | G05B 13/042 |
| 2020/0174490 A1* | 6/2020 | Ogale | ............ | G06N 3/084 |
| 2021/0294944 A1* | 9/2021 | Nassar | ............ | G06F 11/3692 |

OTHER PUBLICATIONS

Brenda Quinlan, What Is a Confidence Interval and Why Is It Important? Part 1 (Year: 2015).*
Confidence Interval, Wikipedia (Year: 2020).*

* cited by examiner

Primary Examiner — Mahmoud S Ismail
Assistant Examiner — Gabriel Anfinrud
(74) Attorney, Agent, or Firm — Lee & Hayes, P.C.

(57) ABSTRACT

Techniques for analyzing driving simulations and determining simulation stability metrics are discussed herein. Various techniques may include receiving a driving simulation and determining a number of perturbed simulations based on the driving simulation. The perturbed simulations may include, for example, one or more perturbed object attributes, perturbed simulation failure conditions, and/or perturbed behaviors of the vehicle system on which the simulation is executed. The perturbed simulations may be executed, and the results may be analyzed to determine a stability score associated with the driving simulation. Stability scores for driving simulations may be determined and maintained based on different simulation data perturbations received based on perturbation models, and the stability scores may be used in various implementations to generate simulation batteries for regression testing and for analyzing and routing simulation failures.

20 Claims, 7 Drawing Sheets

SIMULATION STABILITY ANALYSES BASED ON PARAMETER PERTURBATION

BACKGROUND

An autonomous vehicle may include various software-based systems, hardware-based system, and/or controllers to guide the vehicle through an environment. For example, a controller of an autonomous vehicle can use sensor systems, object perception and prediction systems, and route planning and optimization techniques to determine drive paths and guide the vehicle through environments containing static objects and dynamic objects. In order to ensure the safety of occupants of the vehicle and the objects in the environment, it is important to test and verify the proper operation and safety of the autonomous vehicle systems. Simulated data and driving simulations can be used to test and verify the functionality of autonomous vehicle systems, some of which would be otherwise prohibitive to test in the real world (e.g., due to safety concerns, limitations on time, repeatability, etc.). However, driving simulation failures may have different possible causes, including some causes which may be unrelated to the particular systems being tested. Additionally, analyzing failures in driving simulations to identify the causes may include complex and resource-intensive technical operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
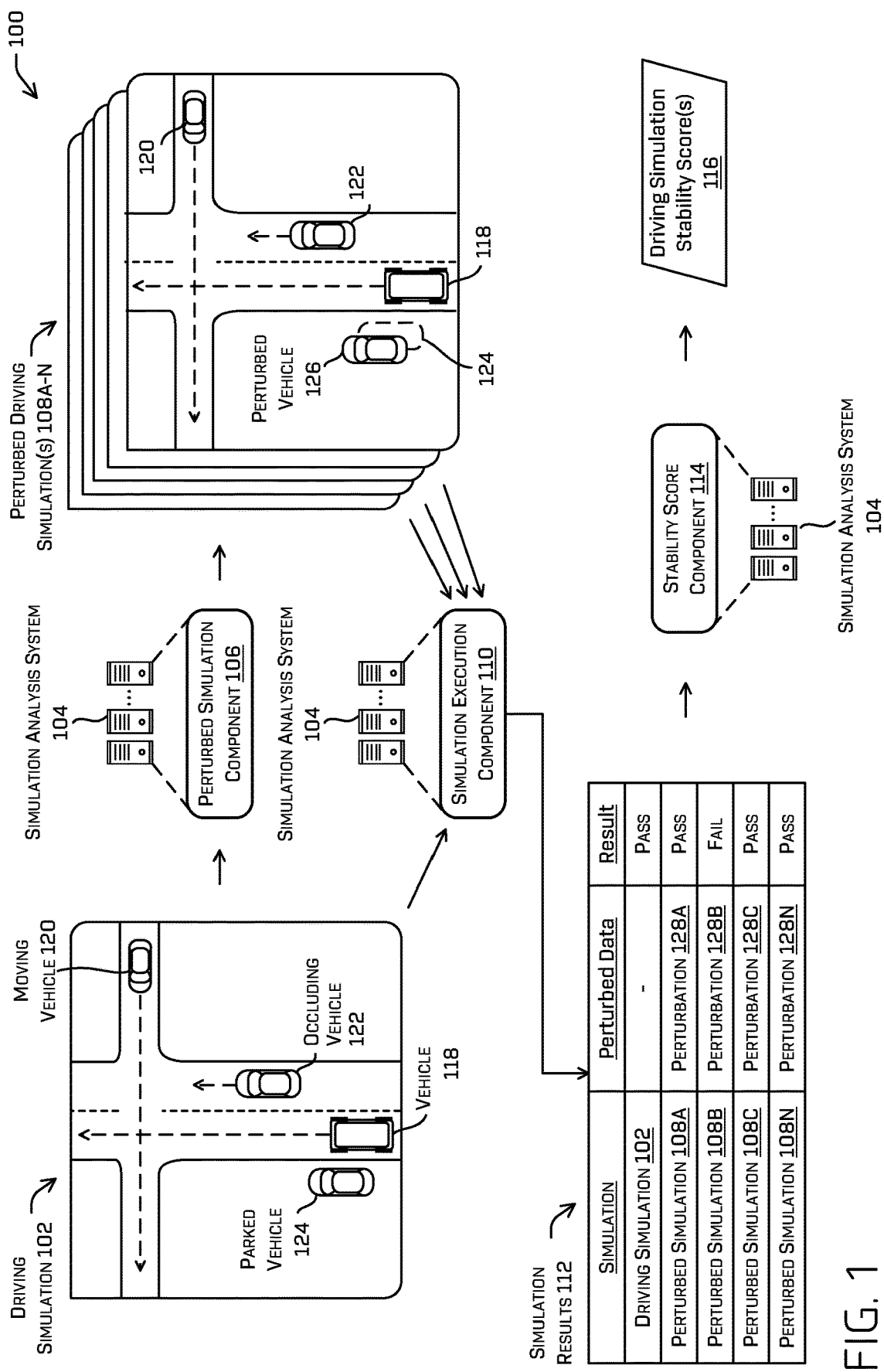
FIG. 1 illustrates techniques for analyzing a driving simulation to determine a simulation stability score, in accordance with one or more implementations of the disclosure.

Techniques described herein are directed to analyzing driving simulations configured to execute on autonomous vehicle systems to determine stability scores and metrics for the driving simulations. In various examples, a simulation analysis system may receive a driving simulation and may determine a number of perturbed simulations based on the driving simulation. The perturbed simulations may include, for example, simulations including one or more perturbed attributes for the simulated objects, simulations including perturbed failure conditions, and/or simulations including perturbed behaviors (e.g., vehicle control instructions) of the autonomous vehicle system on which the simulation is executed. The simulation analysis system may execute one more sets of perturbed driving simulations, and may analyze the results to determine a stability score for the driving simulation. For instance, when a set of perturbed simulations provide results that are relatively uniform and consistent with the results of the unperturbed driving simulation, this may indicate a relatively stable simulation and the simulation analysis system may calculate a higher stability score for the driving simulation. In contrast, when the set of perturbed simulations provide inconsistent results, this may indicate a relatively unstable simulation, and the simulation analysis system may calculate a lower stability score for the driving simulation. In some cases, stability scores for driving simulations may be determined based on multiple sets of perturbed simulations in accordance with perturbation model(s), which may be executed on various systems and builds of the autonomous vehicle system(s) over time. Stability scores for a driving simulation may be maintained, and tracked, updated during the life of the simulation.

Stability scores for driving simulations may be used to determine which simulations to execute on which builds of the autonomous vehicle system, to construct high stability simulation batteries for regression testing, and to implement more efficient simulation failure analysis processes. For example, simulation-based testing of the autonomous vehicle systems may include large batteries of simulation tests, which may be directed to individual systems of an autonomous vehicle (e.g., a perception system, prediction system, planning system, collision avoidance system (CAS), remote teleoperations system, etc.), and/or may test the end-to-end responses of the autonomous vehicle as a whole. Simulations having lower stability scores may provide greater utility and efficiency for some types of simulation tests, while other simulation tests may be more effective or efficient with higher stability simulations. For instance, complex simulations with multiple interacting objects, as well as simulations designed to test precise boundary thresholds, may be more likely to fail as a result of minor changes made to unrelated portions of the code base, or changes to the simulation system or testing environment. As a result, lower stability scores may be calculated for such simulations. While identifying and tracking such simulation failures provides valuable data, a simulation system analyzing these failures may determine a lesser likelihood that the failures were caused by code regressions in the system(s) that the simulation was designed to test. In contrast, simulations having higher stability scores may be less likely to be caused by minor changes in unrelated code sections, or changes in the simulation systems or testing environment. Accordingly, simulations with higher stability scores may be selected for inclusion within regression test batteries executed after recent changes to the code base.

Additionally, in some examples, a simulation system may use automated processes to analyze and/or triage failed simulations based on the stability scores of the simulations. For instance, failures in higher stability simulations have a greater likelihood of being caused by recent changes to the code base that the simulation was designed to test. Thus, for failures of simulations having higher stability scores, a simulation system may automatically initiate pull requests, or may escalate or route simulation failure data to an external analysis system for further analysis and resolution. In contrast, failures of simulations having lower stability scores may be identified and logged, but the simulation system may use different automated processes and target systems for recording, analyzing, and triaging such failures.

Further, the techniques described herein may improve the operations of a computing system. As a non-limiting example of such, the techniques may reduce the computational resources required to determine an envelope of safe operation for a safety critical computing system using a discrete number of distinct scenarios without the need for an inordinate amount of simulations to be run.

FIG. 1 is an illustrated flow diagram 100 that depicts techniques for analyzing a driving simulation 102 to determine a simulation stability score. As shown in this example, a driving simulation 102 may be received by a simulation analysis system 104, which uses a perturbed simulation component 106 to determine a number of perturbed driving simulations 108A-N. A simulation execution component 110 executes the perturbed driving simulations 108A-N and determines a set of simulation results 112 that includes results of the (unperturbed) driving simulation 102 and the perturbed driving simulations 108A-N. A stability score component 114 of the simulation analysis system 104 determines one or more stability scores 116 for the driving simulation 102, based on the simulation results 112.

As described in more detail below, stability scores for driving simulations may be based on the degree to which the results of the perturbed simulations are consistent, and are similar to the results of the unperturbed driving simulation. When a number of perturbed simulations are executed and yield similar or identical results, including simulations that have been perturbed in different ways, by different magnitudes, and/or in different directions, this may indicate that the driving simulation is not susceptible (or less susceptible) to minor code changes, changes to unrelated components, and/or changes in the simulation system or process. Accordingly, the stability score for a driving simulation may be calculated based on the respective numbers of passing and failing perturbed simulations. In particular, if a set of perturbed simulations has either a high or a low failure ratio (indicating a high or low probability of a single perturbed simulation failing), then based on the failure ratio (or probability) the simulation analysis system 104 may calculate a high stability score for the associated driving simulation. To illustrate, both a 5% failure probability and a 95% failure probability for a set of perturbed simulations may indicate a relatively high level of stability of the driving simulation, in that the outcome of a perturbed simulation is predictable to a greater degree. However, for mid-range failure ratios (indicating failure probabilities closer to 50%), the simulation analysis system 104 may calculate a lower stability score for the associated driving simulation. To illustrate, a set of perturbed simulations having a 45% or 55% failure probability may indicate a lower level of stability of the driving simulation, in that the outcome of a perturbed simulation is largely unpredictable.

In various examples, the simulation analysis system 104 may determine and/or generate perturbed simulations by perturbing one or more features of the driving simulation 102. Features that may be perturbed in a driving simulation may include perturbing a simulated object in the simulation environment (e.g., attributes or characteristics of the object), perturbing a failure condition of the simulation (e.g., exceeding a speed limit, a temporal logic associated with safe operation of the vehicle, or the like), and/or perturbing the behavior of the vehicle system on which the simulation is configured to execute. A perturbed simulation determined by the simulation analysis system 104 may include any combination of perturbations to the driving simulation, including perturbations of any simulation feature (e.g., object, failure condition, vehicle behavior, etc.), perturbation values of any magnitude, and/or perturbations in any direction.

As an example, driving simulation 102 may be designed to verify a particular set of behaviors of a simulated vehicle 118, including object detection, proper yielding and compliance with the right-of-way. In this example, the simulated vehicle 118 is moving northbound toward an intersection. Another moving vehicle 120 is approaching the same intersection from a different direction, and an occluding vehicle 122 is partially obscuring the moving vehicle 120 from detection by the simulated vehicle 118. In this example, during the driving simulation 102 the behavior (e.g., the control instructions/responses received from the vehicle system) of the simulated vehicle 118 is observed to verify that the simulated vehicle 118 reduces its speed to below a predetermined threshold when approaching the intersection because of the occlusion caused by the occluding vehicle 122, and then that it stops and yields to the moving vehicle 120. In at least some examples, such an initial scenario may be based at least in part on real data captured by a vehicle in a similar scenario. Of course, such a scenario may be, similarly, completely simulated (e.g., without reliance on accompanying real data).

The perturbations in this example may include perturbing (or modifying) a parked vehicle 124 within the simulation positioned to the right of the simulated vehicle 118 as its approaches the intersection. In this example, the perturbed simulation component 106 may determine and apply multiple different types and magnitudes of perturbations to replace the parked vehicle 124 with a perturbed vehicle 126. The perturbations used by the perturbed simulation component 106 may include one or more positional perturbations (e.g., in the x and/or y directions), size perturbations (e.g., in the x, y, and/or z dimensions), pose perturbations, etc. Multiple different perturbations may be applied to the parked vehicle 124, resulting in multiple different perturbed simulations 108A-N. For instance, a first perturbed simulation 108A may include a position of the parked vehicle 124 that is perturbed by one foot in the x direction, a second perturbed simulation 108B may include a position of the parked vehicle 124 that is perturbed by two feet in the y direction, a third perturbed simulation 108C may include a size of the parked vehicle 124 that is perturbed by one foot in the z direction (e.g., additional height), and so on. In other examples, various other attributes of the objects in the simulation or the simulation environment may be perturbed. For instance, additional perturbed simulations 108 may be based on perturbations to the initial size or velocity of any object(s) in the driving simulation 102, to the size of static obstacles in the driving simulation, or the starting start or time to change for a traffic light in the driving simulation. Additional perturbations may be made during the course of the driving simulation 102, just as in-simulation perturbations to the acceleration and/or trajectory of the objects in the driving simulation. In some examples, the perturbations of any objects in the driving simulation may be performed such that any resulting perturbed simulations that are infeasible (e.g., where a car is instantiated on top of a pedestrian due to the perturbation, etc.) may be excluded.

As the above example illustrates, in some cases the perturbed simulation component 106 may determine perturbations for features in the driving simulation that are unrelated to the particular functionality being tested by the simulation. In driving simulation 102, it may be unexpected that modifying the size, position, or pose of the parked vehicle 124 would cause any change in the behavior of the simulated vehicle 118 as it approaches the intersection. However, as noted above, even perturbations to unrelated features in simulations may affect the simulated vehicle systems in unanticipated ways that may bring about a simulation failure. For instance, the simulated vehicle 118 may include code that makes minor adjustments to the speed or trajectory of the vehicle in certain situations when passing a parked car. Therefore, the perturbations to the parked vehicle 124 in this example may cause a small change in the speed or trajectory of the simulated vehicle 118 as it approaches the intersection. Even a small change in speed or trajectory caused by the parked vehicle 124 may change the amount of occlusion from the occluding vehicle 122 affecting the simulated vehicle 118 during a relevant time, the detection or classification of the moving vehicle 120 simulated vehicle 118, and the time and/or angle from which the simulated vehicle 118 arrives at the intersection. Therefore, perturbations to the parked vehicle 124 may initiate a cascade effect that causes the simulated vehicle 118 to behave differently with respect to detecting the moving vehicle 120, yielding and complying with the right-of-way, potentially resulting in failing perturbed simulations. As such, the perturbations may also provide an envelope (or boundary) of safe operations and not solely a metric on the scenario itself.

The simulation execution component 110 executes each of the perturbed simulations 108A-N, and determines results of the simulation test. In some examples, the simulation execution component 110 may compare the responses of the autonomous vehicle systems to one or more failure conditions associated with the driving simulation 102, to determine whether the simulations passed or failed. Various different types of failure conditions may be applied for different driving simulations. For instance, driving simulation 102 may include a failure condition requiring that the simulated vehicle 118 not collide with (or breach a safety buffer around) any other object in the driving simulation 102. Other examples of failure conditions may include requirements that the simulated vehicle 118 occupies (or does not occupy) a position or range of positions at certain times during the simulation, or may include failure conditions requiring specific driving actions to be performed (or not performed) at certain times in the simulation, or requiring certain driving routes/trajectories to be selected (or not selected), etc. Of course, any number of such failure conditions may be represented as temporal logic statements, algorithms, or otherwise.

In this example, the simulation execution component 110 has determined a set of simulation results 112 that includes simulation identifier, an indication of the perturbed data 128A-N, and a simulation result for the driving simulation 102 and each of the perturbed simulations 108A-N. The perturbed data may indication which features of the driving simulation were perturbed and the details of the perturbation(s) (e.g., objects and perturbed attribute values, perturbed failure condition values, perturbed vehicle behaviors, etc.). In this example, the simulation results 112 include a binary pass/fail indication for each executed simulation. As discussed below, the pass/fail simulation results may be used in some examples to calculate failure probabilities and stability scores. However, in other examples simulation results need not be binary, but may be output as number values (e.g., 1-100) or as any other measurable simulation result metric.

The stability score component 114 may use the simulation results 112 for the perturbed simulations 108A-N to determine one or more stability scores for the driving simulation 102. In some examples, the stability score component 114 may analyze the simulation results 112 to determine a probability that a particular perturbed simulation 108 will fail. As noted above, the perturbed simulation component 106 may determine a fixed set of perturbed simulations 108, based on predetermined sets of simulation features to perturb and associated sets of perturbation values. In such cases, the probability that a perturbed simulation 108 is a failing simulation corresponds to the ratio of failing perturbed simulations to the total number of perturbed simulations. Simulation results 112, for example, indicates that one perturbed simulation (second perturbed simulation 108B) failed, and three perturbed simulations (108A, 108C, 108N) passed, resulting in a failure probability of 0.25.

In some implementations, instead of selecting a fixed set of perturbation data including the features to perturb and the perturbation values (or amounts), the perturbed simulation component 106 may randomly select samples from a perturbation model. For instance, perturbed simulation component 106 may use a model that defines a specific set of the simulation features (e.g., objects, attributes, failure conditions, vehicle behavior etc.) that may be varied (or perturbed) in each perturbed simulation, and a distribution (e.g., truncated normal) of values for each perturbed feature. Based on the perturbed featured and distributions, the perturbed simulation component 106 may use a Monte Carlo technique to randomly sample from the perturbed feature distributions. In this example, the failure probability a perturbed simulation may be determined based on Equation 1 below.

$$P(\text{fail}) = \frac{1}{n}\sum_{i=1}^{n} f(X_n) \quad \text{Equation 1}$$

In this example, P(fail) represents the failure probability associated with the perturbation model used by the perturbed simulation component 106 to determine the perturbed simulations 108, n represents the number of perturbed simulations, and $f(X_n)$ represents an indicator function corresponding to whether the simulation failed.

Using the failure probability P(fail) determined for the perturbed simulations 108, the stability score component 114 may calculate a stability score 116 for the driving simulation 102. In various implementations, the stability score component 114 may calculate stability scores 116 in accordance with different score types and/or value scales. In some examples, a [0-1] scale of stability may be calculated from the failure probability using Equation 2 below.

$$S = 2|P(\text{fail}) - 0.5| \quad \text{Equation 2}$$

In this example, S represents the stability score for the driving simulation 102, on a number scale from zero (0=least stable) to one (1=most stable). Thus, if the failure probability P(fail) of the perturbed simulations 108 equals 50% (0.5), then the stability score S for the driving simulation 102 will equal zero. If the failure probability P(fail) of the perturbed simulations 108 equals either 0% (0.0) or 100% (1.0), then the stability score S for the driving simulation 102 will equals one. In at least some examples, the score may also indicate (or be dependent upon) a measure of how far the perturbed scenario differed from an original scenario. As a non-limiting example, features may be encoded into a vector and a weighted Euclidian distance may be computed between the scenarios (time of day, stop line position, object velocity, etc.) and used to determine the stability score or provide along with such a score. For instance, such a distance may be used to limit stability (e.g., only scenarios which differ by less than some threshold difference) or otherwise to inform an envelope of drive operations.

The stability scores 116 calculated for driving simulations 102 by the simulation analysis system 104 may be used by simulation systems in a variety of technical applications. For instance, a driving simulation system may retrieve and use stability scores 116 for a repository of driving simulations 102 to determine which simulations to run, how often, and on which systems and builds. For instance, a simulation system may select driving simulations 102 with higher stability scores 116 for frequency executed regression simulation test batteries. Additionally, a simulation system may analyze and process simulation failures differently based on the stability scores 116. For instance, failures of driving simulations 102 having lower stability scores 116 are more likely to be caused by changes to unrelated portions of the code base, or changes to the simulation system or testing environment. As such, failures of simulations with lower stability scores 116 may be logged and actively tracked, but might not be used to trigger an immediate pull request or to triage the software bug/trouble ticket to be routed to a priority analysis system for immediate further analysis. However, failures of simulations with higher stability scores 116 are more likely to indicate code regressions in the autonomous vehicle system(s), and as a result the simulation system may initiate a pull request or other code tree management action and/or may capture and transmit the simulation failure data to an analysis system for further evaluation. Similarly, such a stability score may be used while driving. For instance, if the stability score is high, the vehicle may determine that it is in a similar scenario (e.g., within a threshold distance as above) and proceed with confidence that the vehicle will be able to respond safely. Otherwise, as another example, while in a scenario related to a high instability (low stability) scenario, the vehicle may proceed using a higher level of caution (lower speeds, more conservative maneuvers, greater deference to surrounding objects, etc.).

Figure 2:
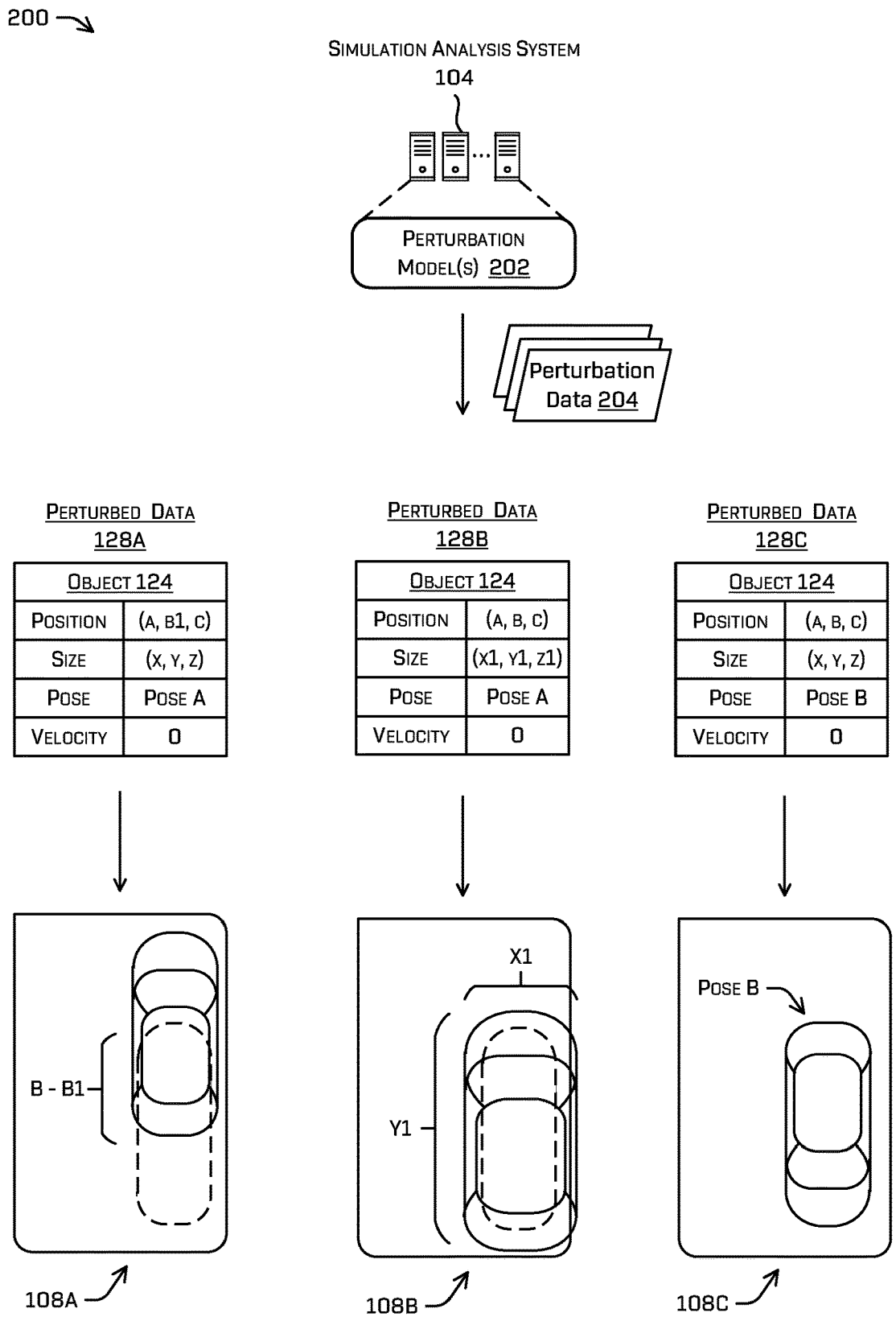
FIG. 2 illustrates techniques for determining perturbed driving simulations based on perturbed object data, in accordance with one or more implementations of the disclosure.

FIG. 2 is an illustrated flow diagram 200 that depicts techniques for determining perturbed driving simulations based on perturbed data. In this example, one or more perturbation model(s) 202 (which also may be implemented as a perturbation model component) may be used to determine the perturbation data 204 used by the perturbed simulation component 106 to determine (and/or generate) the set of perturbed simulations 108A-N. Perturbation data 204 may include the data defining the set of perturbed simulations 108A-N in relation to the original (unperturbed) driving simulation 102. For instance, a set of perturbation data 204 associated with a driving simulation 102 may include one or more features within the driving simulation 102 (e.g., object attributes, failure conditions, simulated vehicle command instructions, etc.) to be perturbed, as well as the perturbation values identify how and/or how much the features are to be perturbed.

As noted above, in some cases the perturbation data 204 may include a predetermined set of simulation features and perturbation values, which may be manually or automatically selected for the driving simulation 102. As an example, the perturbation data 204 for a driving simulation 102 may specific a particular object classification (e.g., vehicles), one or more attributes (e.g., x-position, y-position), and a perturbation value (e.g., +/−0.1 meters). In this example, the resulting set of perturbed simulations 108 may include combinations of the perturbed vehicles in the driving simulation 102 whose positions have been perturbed in the x and y directions by 0.1 meters. Although this example illustrates only a single object classification type and two attributes to perturb, it is understood that similar techniques may be applied to determine sets of perturbed simulations 108 having any combination of perturbed features, attributes, values, etc. Additionally or alternatively, the perturbation model(s) 202 may sample from a distribution to determine the perturbation values within the perturbation data 204. For instance, the perturbation model(s) 202 may provide uniform distributions of perturbation values associated with different features within the driving simulation 102.

When using either fixed or randomly sampled perturbation values, the perturbation values may be relative to the nominal value associated with the feature in driving simulation 102. For instance, a length perturbation value of 0.1 meters may be applied to an object in the driving simulation 102 having a length of 5 meters, meaning the length of the object in the perturbed simulations 108 may be 4.9 meters and 5.1 meters, etc.

As noted above, the perturbation model(s) 202 may determine the simulation features to perturb and/or the perturbation values indicating how or by how much the feature will be perturbed in the perturbed simulations 108. It can be understood from the context of this disclosure, that the quality of perturbation features and values selected may determine the usefulness of the stability scores. For example, the driving simulation 102 may include certain features (e.g., particular object types, attribute types) that are not perceived or used by the autonomous vehicle systems to control the vehicle in the environment. Therefore, perturbation of such features may have little or no effect on the simulation results 112, and the resulting stability score (e.g., completely stable) might not be accurate or informative. Similarly, if the perturbation values selected are too large (e.g., position perturbed by 10 meters, velocity perturbed by 20 MPH, etc.), or too small (e.g., object size perturbed by 0.01 meters, etc.), then the resulting perturbed simulations 108 would not provide a useful or realistic measurement of simulation stability. Accordingly, the perturbation model(s) 202 may be configured to output data realistic perturbation values. In some cases, realistic perturbation values may be predetermined based on the feature type and/or attribute type, and the perturbation model(s) 202 may sample from a uniform distribution with a set of predetermined limits (e.g., +/−0.1 meters for object position or object size). The perturbation model(s) 202 may sample from a truncated normal distribution in some cases.

In some examples, the perturbation model(s) 202 may maintain multiple distributions of perturbation values, and the simulation analysis system 104 may be configured to evaluate the distributions over a period of time. For instance, to evaluate a distribution of perturbation values, the simulation analysis system 104 may capture a large dataset of executed driving simulations, and measure the distribution of simulations labeled as stable (e.g., having a stability score greater than a threshold value) and the aggregated pass/fail results of the stable simulations. Similarly, the simulation analysis system 104 may analyze a large dataset of distribution of simulations labeled as not stable, including the aggregated pass/fail results of the not stable simulations, and the results may be evaluated to confirm the stable/not stable labeling. For simulations where the aggregated pass/fail results do not correspond to the labeling of the driving simulation 102, the simulation analysis system 104 may determine that the distribution of perturbation values initially used to label the simulation was low quality (e.g., not representative of realistic perturbations), and may re-label the simulation and/or replace the low quality distribution.

In some examples, the perturbation model(s) 202 and/or other component within the simulation analysis system 104 may determine confidence intervals associated with the perturbation features and distributions of perturbation values stored within the perturbation model(s) 202. The confidence intervals associated with the perturbation model(s) 202 may be used to determine the number of samples selected from the perturbation model(s) 202 and the corresponding number of perturbed simulations generated and executed by the simulation analysis system 104. Due the cost in time and computing resources of generating and executing perturbed simulations 108, it can be understood that confidence intervals may provide technical advantages of reducing or minimizing the number of perturbed simulations 108 executed to determine stability scores with a sufficient level of confidence. Confidence intervals for the perturbation model(s) 202 may be determined based on sample variances from the distribution (e.g., a simple Monte Carlo distribution), using the central limit theorem. In various examples, the variances and confidence intervals may be constructed for the failure probability P(fail) or for the stability score S of a driving simulation 102. The simulation analysis system 104 may determine confidence intervals separately for each driving simulation 102 in some cases, and may use the confidence intervals to dynamically tune the number of perturbation simulation 108 performed during the process of determining a stability score 116 for the driving simulation 102.

Perturbation data 204 may relate to any feature of a driving simulation 102, including but not limited to the attributes of objects in the simulation, the failure conditions associated with the simulation, and the behaviors (e.g., vehicle control instructions) received from the simulated autonomous vehicle system during the simulation. As depicted in FIG. 2, in this example the perturbation data 204 includes three sample perturbed data sets 128A-C. Each of the sample perturbed data sets 128A-C includes attribute data for the parked vehicle 124 from the driving simulation 102. The first perturbed data set 128A includes the same attributes for the parked vehicle 124 as those in the unperturbed driving simulation 102, with the exception of the y-position coordinate which has been perturbed from value B to B1. The perturbation of the y-position coordinate from the first perturbed data set 128A is represented graphically in the first perturbed simulation 108A. In the second perturbed data set 128B, the three size dimension attributes: x-size (length), y-size (width), and z-size (height) are perturbed to enlarge the parked vehicle 124 in the second perturbed simulation 108B, in comparison to the size of the same parked vehicle 124 in the unperturbed driving simulation 102. In the third perturbed data set 128C, the pose attribute is perturbed to rotate the orientation of the parked vehicle 124 by 180 degrees in the third perturbed simulation 108C, in comparison to the orientation of the same parked vehicle 124 in the unperturbed driving simulation 102.

Figure 3:
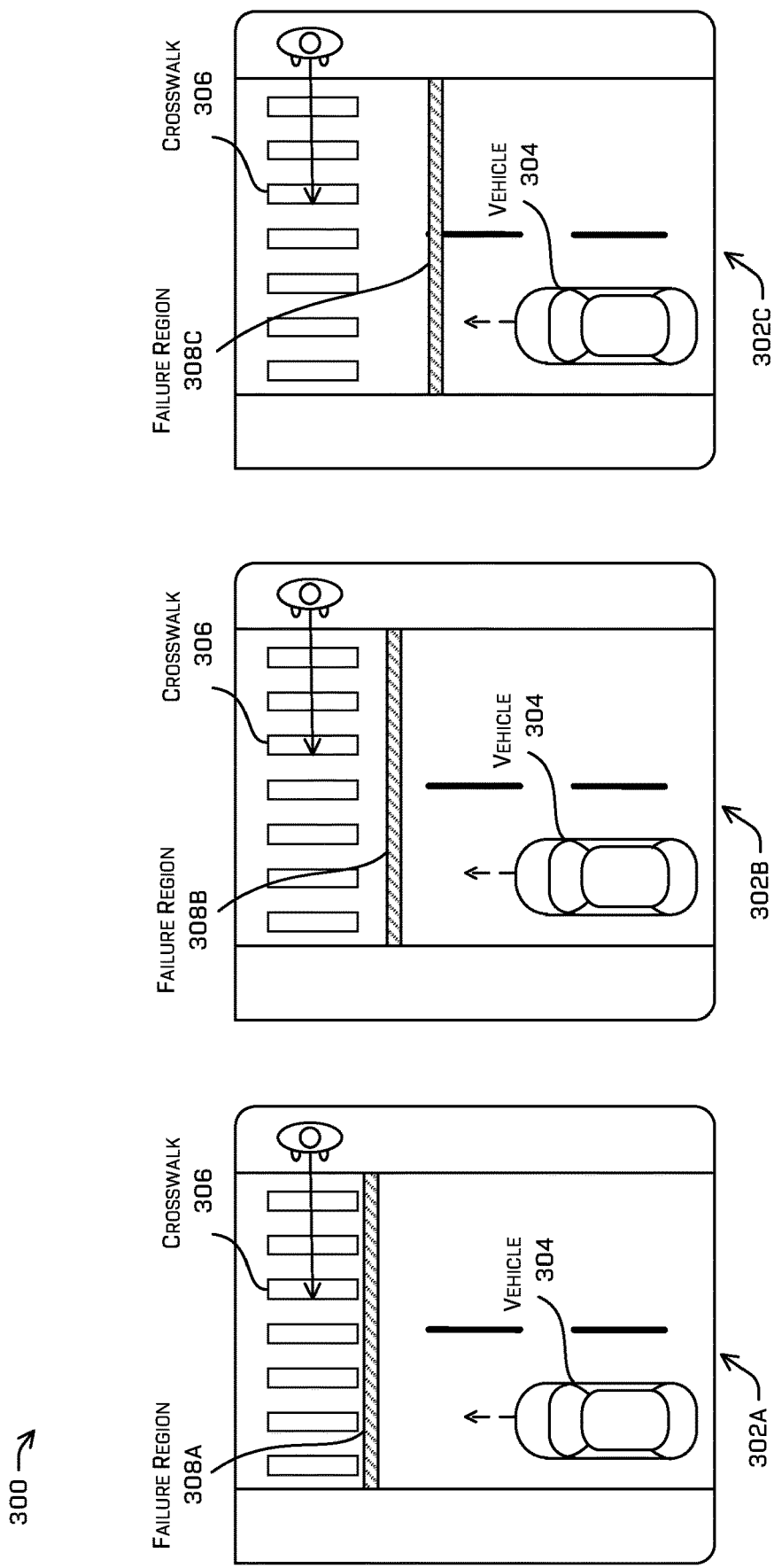
FIG. 3 illustrates techniques for determining perturbed driving simulations based on perturbed failure conditions, in accordance with one or more implementations of the disclosure.

FIG. 3 is an illustrated diagram 300 depicting additional techniques for determining perturbed driving simulations. In this example, a failure condition associated with a driving simulation has been perturbed, resulting in three perturbed simulations 302A-C illustrating the three separate perturbed failure conditions. The driving simulation in this example may be designed to verify that a simulated vehicle 304 stops before a crosswalk 306. The simulated vehicle 304 may determine whether or not to stop before the crosswalk 306 in this scenario, and precisely where to stop, based on various simulation data including the speed of the simulated vehicle 304, the distance to the crosswalk, the presence of pedestrians, a stop light or stop sign at the intersection, and so on. In this simulation, the verified behavior is for the simulated vehicle 304 to stop in front of the crosswalk 306, and a passing simulation is one in which the simulated vehicle 304 does not enter a failure region 308A-C.

In this example, the driving simulation and perturbed simulations 302A-C may be identical with respect to the simulated environment, all objects in the environment, and the behavior of the simulated vehicle 304. However, three different failure regions 308A-C are depicted in the different perturbed simulations 302A-C. Thus, the simulation may potentially fail for none, some, or all of the perturbed simulations 302A-C based on if and where the simulated vehicle 304 stops during the simulation.

In the above example, the failure condition for the driving simulation is represented by failure regions 308A-308C into which the simulated vehicle 304 cannot enter or the simulation will be marked as failing. In other examples the simulation analysis system 104 may determine additional perturbed simulations based on different types of failure conditions (or failure criteria) associated with the driving simulation. For instance, the perturbed simulation component 106 may determine additional perturbed simulations by perturbing the size or distance of the safety buffer around the objects in the simulation, which the simulation uses to determine what is marked as a collision. In other examples, the perturbed simulation component 106 may perturb the amounts of time that the simulated vehicle is provided to complete the simulation (or a portion thereof).

As these examples illustrate, there may be additional advantages of reduced execution time and reduced computing resources for implementations using perturbed failure conditions for the perturbed simulations. Unlike certain perturbations of simulated objects or simulated vehicles, a simulation may be executed a single time and evaluated with multiple different perturbed failure conditions. For instance, in the example of FIG. 3 and similar examples, many different perturbations of stopping regions or other failure conditions may be generated and evaluated without perturbing any of the simulation code or objects, and within a single execution of the simulation.

Figure 4:
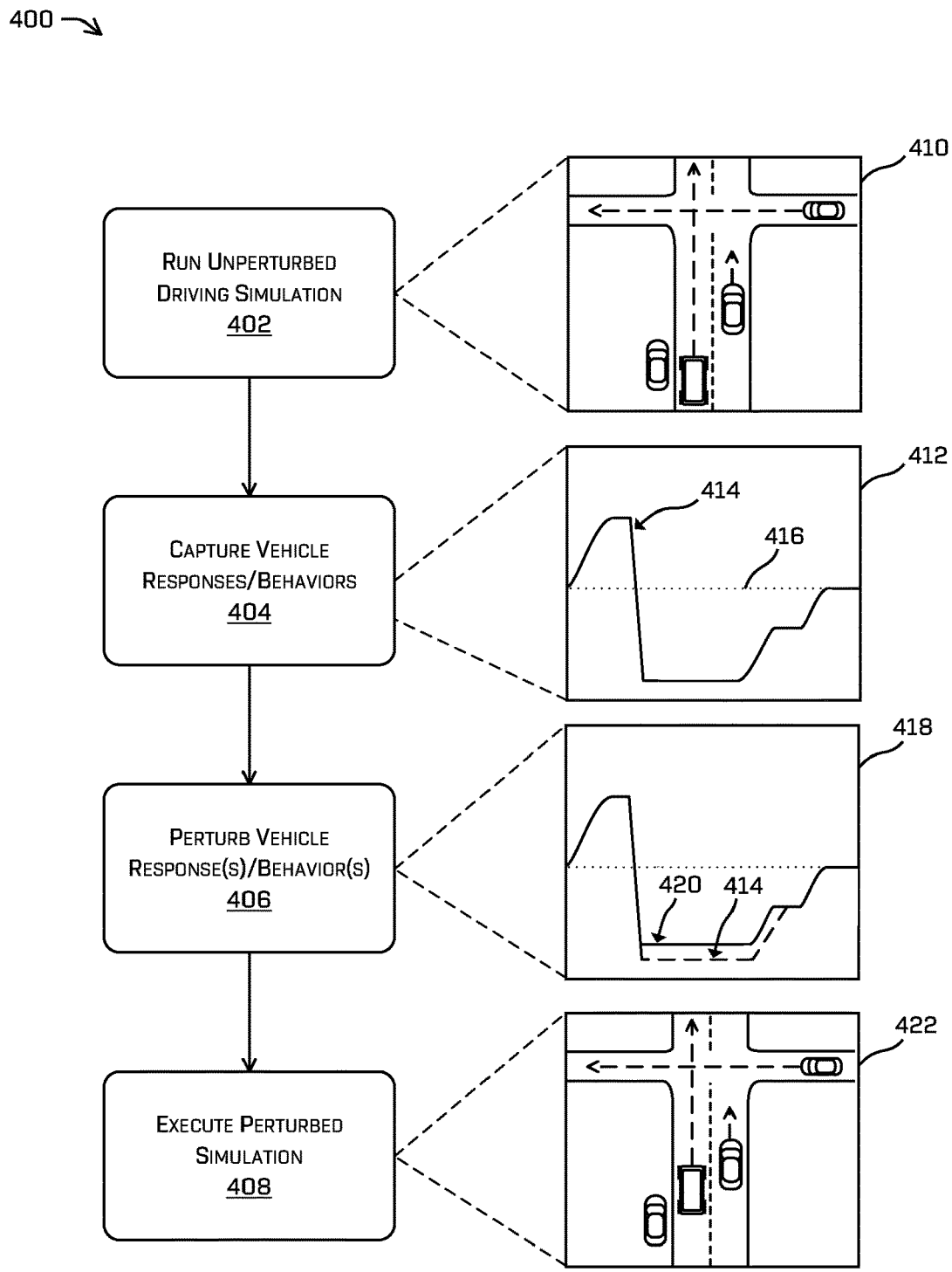
FIG. 4 illustrates techniques for determining perturbed driving simulations based on perturbed vehicle behaviors, in accordance with one or more implementations of the disclosure.

FIG. 4 is an illustrated flow diagram 400 depicting additional techniques for determining perturbed driving simulations. In particular, this example depicts techniques for determining perturbed driving simulations based on perturbed behaviors of the simulated vehicle. As described below; the simulation analysis system 104 may initially execute the unperturbed driving simulation 410, during which the simulation analysis system 104 captures the vehicle instruction commands received from the autonomous vehicle systems.

At operation 402, the simulation execution component 110 receives and executes the (unperturbed) driving simulation 410. For example, during the execution of the driving simulation 410, the simulation execution component 110 may transmit simulation data (e.g., log data including a simulation environment, state data, simulation object data, etc.) to the autonomous vehicle systems for which the simulation test is executing. The autonomous vehicle systems may respond to the simulation data with vehicle control instructions, such as acceleration/braking instructions, trajectory instructions, or any other vehicle control command. The simulation execution component 110 uses the vehicle control instructions received from the autonomous vehicle systems to control a simulated vehicle during the execution of the driving simulation 410.

At operation 404, during the execution of the driving simulation 410, the simulation execution component 110 (and/or other components in the simulation analysis system 104) may capture a series of vehicle responses and/or behaviors received from the autonomous vehicle systems during the driving simulation 410. As discussed above, the behavior data captured in operation 404 may include a timestamped set of vehicle control instructions to control the acceleration, trajectory, or other operations of the simulated vehicle within the driving simulation. In this example, graph 412 is depicted in connection with operation 404. Within graph 412, line 414 may represent the acceleration commands received from the autonomous vehicle systems during the driving simulation 410. Line 416 represents zero (0) acceleration, with points above line 416 corresponding to positive acceleration and with points below line 416 corresponding to negative acceleration (e.g., braking).

At operation 406, the perturbed simulation component 106 may perturb the vehicle responses and/or behaviors captured from the autonomous vehicle systems in operation 404. In this example, the perturbed simulation component 106 may perturb the line 414 representing the acceleration into a modified line 420 representing a set of perturbed acceleration commands. The modified (or perturbed) line 420 may change the maximum deceleration rate from a first value (e.g., 3 m/s$^2$) to a perturbed second value (e.g., 2.5 m/s$^2$).

At operation 408, the simulation execution component 110 executes a perturbed simulation 422 which includes the perturbed acceleration line 420 determined operation 406. As in the above examples, the simulation execution component 110 may initiate the execution of the perturbed simulation 422 by providing simulation data (e.g., simulation environment data, state data, object data, etc.) to the autonomous vehicle systems. However, in this example, when the simulation execution component 110 receives responses from the autonomous vehicle systems in the form of vehicle control instructions, it may intercept and perturb one or more of the acceleration commands, so that the simulated vehicle acceleration pattern during the perturbed simulation 422 matches the perturbed line 420 rather than the initial unperturbed line 414.

Although the above example relates to perturbing acceleration commands of the simulated vehicle during a perturbed simulation 422, in other examples the simulation execution component 110 may intercept and perturb any desired vehicle control instructions. Additionally, these examples may illustrate additional advantages of the above techniques for determining perturbed driving simulations based on perturbed behaviors of the simulated vehicle. For instance, stability scores for driving simulations may be determined in anticipation of code changes that affect the behaviors and responses of the autonomous vehicle systems which the simulation is designed to test. Therefore, by directing intercepting and perturbing the vehicle control instructions, the simulation analysis system 104 may more closely mimic the effect of code changes on driving simulations, without the need to perturb or modify the environment, objects, or failure conditions of the driving simulation.

Figure 5:
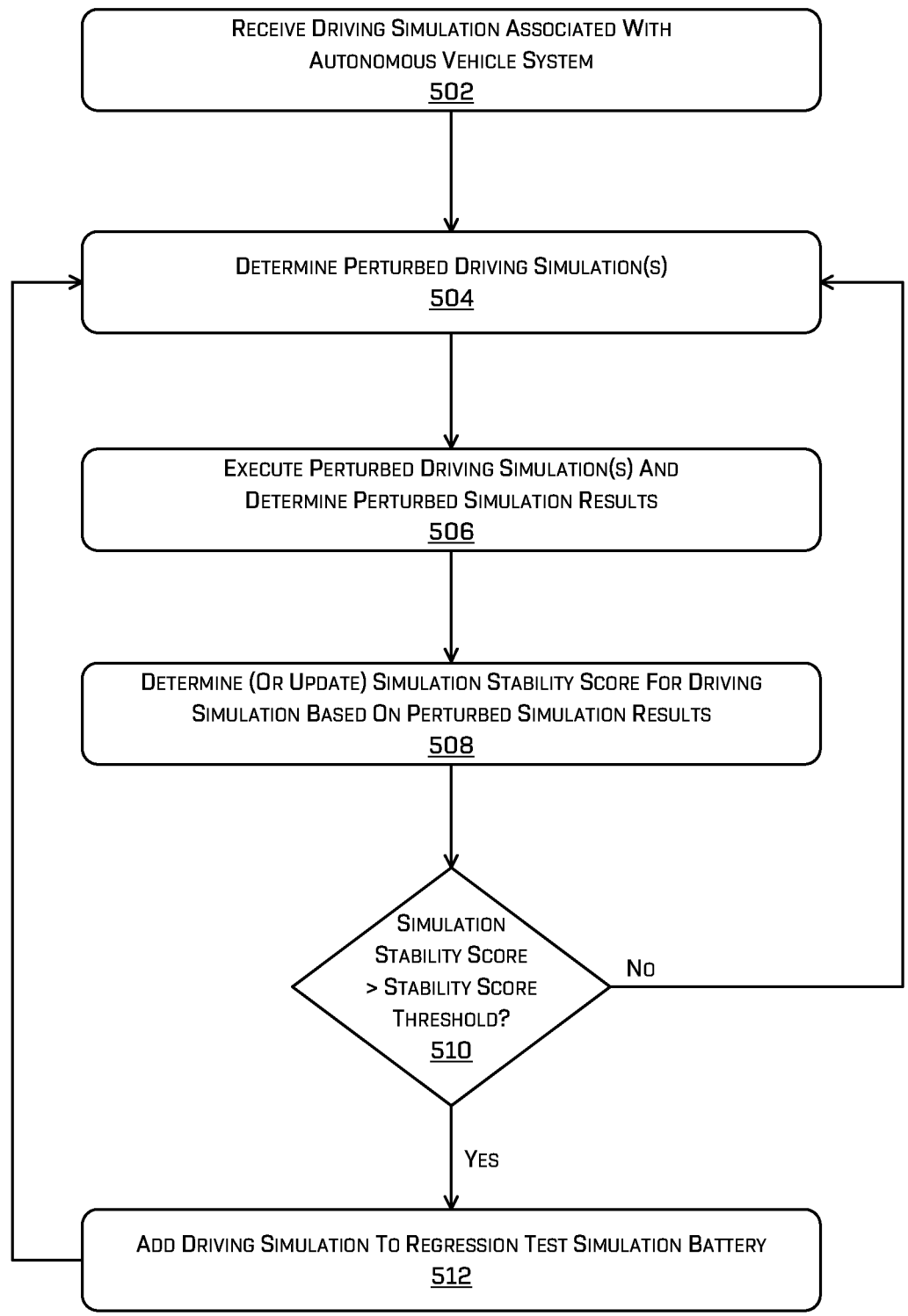
FIG. 5 is a flow diagram illustrating an example process of analyzing a driving simulation to determine a simulation stability score, in accordance with implementations of the disclosure.

FIG. 5 is a flow diagram illustrating an example process 500 of analyzing a driving simulation to determine a simulation stability score in accordance with the various techniques described herein. The operations of process 500 may be performed by one or more components within a simulation analysis system 104, such as a perturbed simulation component 106, a simulation execution component 110, and/or a stability score component 114. However, it can be understood from the context of this disclosure that the operations of process 500 may be performed by any combination of the components described herein.

At operation 502, a simulation analysis system 104 may receive a driving simulation associated with an autonomous vehicle system. In some instances, the driving simulation may be designed to test and validate certain responses or functionalities of the autonomous vehicle systems, such as object detection and identification, collision avoidance, object trajectory prediction, vehicle action determinations, route selections, and so on. As described above, driving simulations may include simulation data describing a simulation environment, simulation state data, simulation object data, and passing/failing conditions.

At operation 504, the simulation analysis system 104 may determine one or more perturbed driving simulations, based on the driving simulation received at operation 502. As described above, the perturbed simulation component 106 may perturb a simulation feature or combination of features, such as any static or dynamic attributes of simulated objects, any characteristics of the simulated environment, any failure conditions associated with the simulation, and/or the behaviors/responses of the autonomous vehicle systems. In some examples, the perturbed simulation component 106 may receive perturbation data from perturbation model(s) 202 indicating the simulation features to perturb and one or more perturbation values (e.g., a truncated normal distribution of values from which to sample).

At operation 506, the simulation analysis system 104 may execute the perturbed simulations, and determine simulation results associated with the perturbed simulations. In some examples, the simulation execution component 110 may execute the perturbed simulations, during which the simulation execution component 110 may transmit simulation data to the autonomous vehicle systems and may receive back vehicle control instructions (e.g., responses/behaviors) to be applied to the simulated vehicle. During execution of the perturbed simulations, the simulation execution component 110 may monitor the vehicle control instructions and/or the state of the perturbed simulation to determine a result (e.g., pass/fail) for each perturbed simulation. Pass/fail results may be determined by comparing a set of pass or fail conditions associated with the simulation to the current simulation state, object states, autonomous vehicle systems and/or controller responses, etc. In some examples, the simulation execution component 110 may implement dynamically tuning using confidence intervals associated with the perturbed simulations (and/or a perturbed model) to determine the number of perturbation simulations determined in operation 504 and/or executed in operation 506.

At operation 508, the simulation analysis system 104 may determine a stability score associated with the driving simulation received in operation 502. As described above, a stability score component 114 may use various different techniques to calculate stability scores based on the results of a set of perturbed simulations. In some cases, the stability score component 114 may initially calculate a failure probability for a set of perturbed simulations (and/or a perturbation model), and then may derive the stability score based on the perturbed simulation failure probability. As an example, the stability score for the driving simulation may be represented as a number from zero (0=least stable) to one (1=most stable).

At operation 510, the simulation analysis system 104 may compare the stability score for the driving simulation to a stability score threshold. As discussed above, stability scores may be used by simulation systems to determine when, where, and/or how often a driving simulation is executed. For instance, a simulation system may use the stability scores for a number of available driving simulations to construct high stability simulation batteries for regression testing. As noted above, although low stability simulations may provide valuable test data, it may be more efficient in some implementations to select simulations having higher stability scores for inclusion within regression test batteries that are executed frequently after changes to the code base. Driving simulations with higher stability scores may have less likelihood of failing due to minor changes in unrelated portions of the code base, or changes to the simulation system or testing environment. As such, selecting simulations with higher stability scores may improve efficiency and reduce false-positive failures within regression batteries.

In this example, if the stability score for the driving simulation (e.g., 0.85) is greater than a predetermined stability score threshold (e.g., 0.7) (510:Yes), then at operation 512 the simulation analysis system 104 (and/or other simulation system) may add the driving simulation to a regression test simulation battery including high-stability simulations. In contrast, if the stability score for the driving simulation (e.g., 0.65) is not greater than the predetermined stability score threshold (510:No), then the driving simulation is identified as a lower stability driving simulation and is not added to the regression test simulation battery.

As shown in FIG. 5, regardless of whether the driving simulation is added to regression test simulation battery, process 500 may return to operation 504 to repeat operations 504-510 or 504-512 in an execution loop. As described above, multiple sets of perturbed simulations may be determined and executed for a driving simulation (e.g., by random sampling from a perturbation model 202). In such cases, the stability score for a driving simulation may be stored, updated as needed in operation 508, and tracked during the life of the simulation. When a simulation becomes more or less stable over time, it may be added to or removed from the regression test simulation battery and/or various other test batteries.

Figure 6:
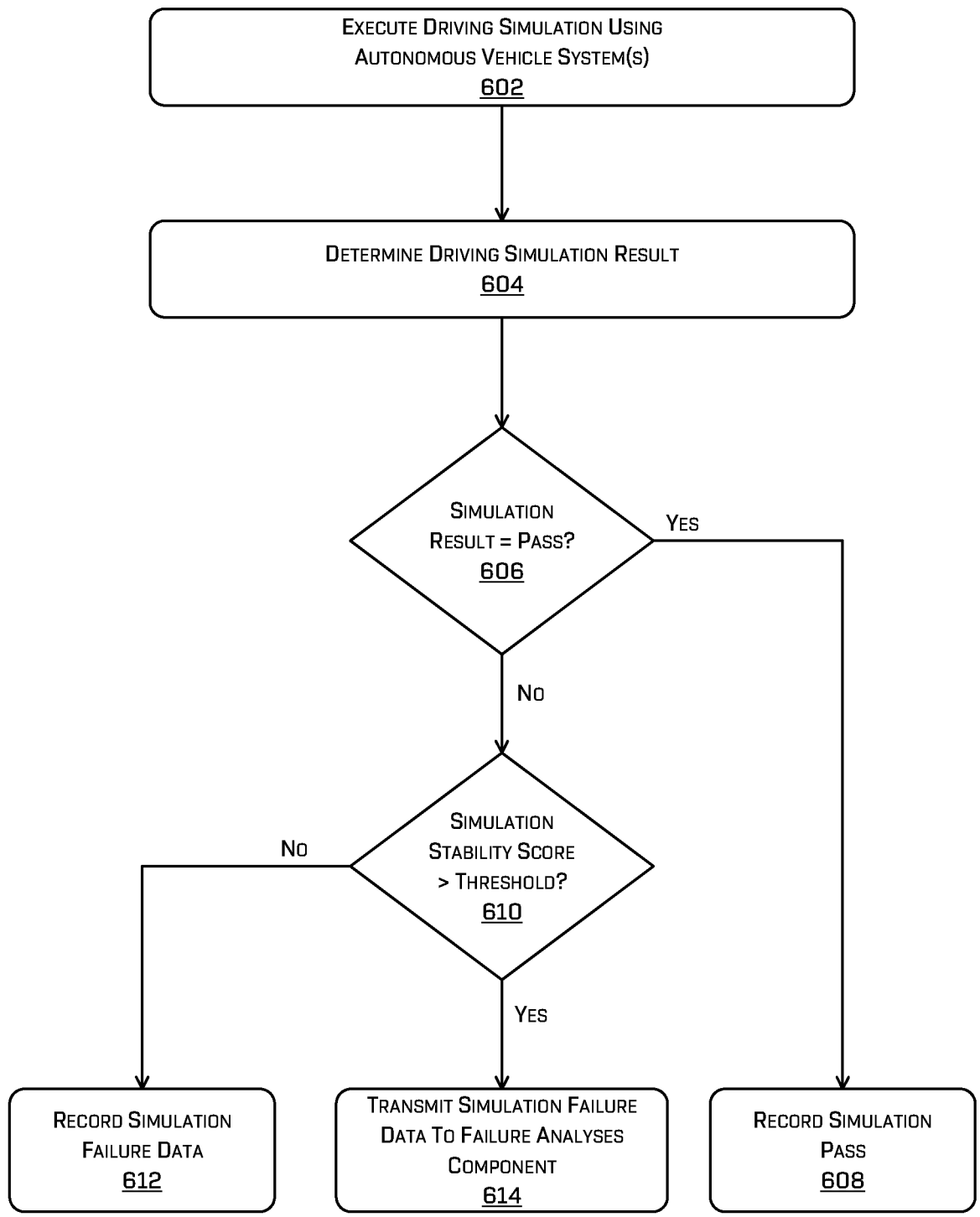
FIG. 6 is a flow diagram illustrating an example process of executing and analyzing the results of driving simulations, in accordance with implementations of the disclosure.

FIG. 6 is a flow diagram illustrating an example process 600 of executing and analyzing the results of driving simulations based on the stability scores of the driving simulations. In some examples, the operations of process 500 may be performed by one or more components within a simulation system, such as a simulation execution component 110 within a simulation analysis system 104, or within a separate driving simulation system. Further, it can be understood from the context of this disclosure that the operations of process 500 may be performed by any combination of the components described herein.

At operation 602, a simulation system (e.g., simulation execution component 110) may execute a driving simulation on one or more autonomous vehicle systems. As discussed above, the simulation execution component 110 may execute a driving simulation (e.g., driving simulation 102) by transmitting the simulation data to the autonomous vehicle systems and receiving back vehicle control instructions (e.g., responses/behaviors) to be applied to the simulated vehicle within the simulation.

At operation 604, the simulation system may determine a result of the driving simulation executed in operation 602. During execution of the driving simulation in operation 602, the simulation execution component 110 may monitor the vehicle control instructions and/or the state of the driving simulation to determine a result for the simulation. In some instances, simulation results may be binary (e.g., pass/fail) results, but in other cases simulation results may be indicated as number values (e.g., 1-100) or as any other measurable metric. The simulation execution component 110 may determine simulation results by monitoring the execution of the simulation, including the simulation state data transmitted to the autonomous vehicle systems and the vehicle control instructions transmitted by from the autonomous vehicle systems, and comparing a set of pass or fail conditions associated with the driving simulation to the current simulation state, object states, autonomous vehicle systems and/or controller responses, etc.

At operation 606, the simulation execution component 110 may determine if the driving simulation executed in operation 602 passed. In some cases, simulation results determined in operation 604 may directly indicate a pass/fail result. In other examples, the simulation execution component 110 may retrieving a passing threshold (e.g., a numeric threshold), and may compare the simulation results determined in operation 604 to the passing threshold. In this example, if the driving simulation passed (608:Yes), process 600 may proceed to operation 608 where the passing results of the driving simulation may be recorded.

In contrast, if the driving simulation did not pass (608:No), process 600 may proceed to operation 610 where the simulation may be further analyzed and triaged based on the stability score of the simulation. For instance, in operation 610 the stability score for the driving simulation may be retrieved and compared to a predetermined stability score threshold. As noted above, in the event of simulation failures the simulation system may use analyze and/or triage the simulation failures based on the stability scores of the simulations. Failures in higher stability simulations have a relatively greater likelihood of being caused by recent changes to the code base that the simulation was designed to test. By contrast, failures in lower stability simulations have a relatively greater likelihood of being caused by other issues such as minor changes in unrelated portions of the code base, or changes to the simulation system or testing environment.

Although failures in lower stability simulations should not be disregarded, in some implementations they are likely to be may be less serious and less time sensitive. Accordingly, in this example, if the stability score for the driving simulation is not greater than the stability score threshold (610:No), then in operation 612 the simulation execution component 110 may record the simulation failure for tracking purposes and/or future analysis. However, if stability score for the driving simulation is greater than the stability score threshold (610:Yes), then in operation 614 the simulation execution component 110 may capture and transmit the relevant simulation failure data to a simulation failure analysis component 738. In some examples, the routing of simulation failure data in operation 614 may comprise a higher priority and triage level than the recording of the simulation failure data in operation 612. For instance, the capture and transmission of the routing of simulation failure data in operation 614 may be expedited and transmitted to one or more advanced regression systems and/or specialized personal for further analysis and re-testing. In some examples, operation 614 also may include the simulation execution component 110 automatically initiating a pull request or opening a software bug or trouble ticket associated with the simulation failure.

Figure 7:
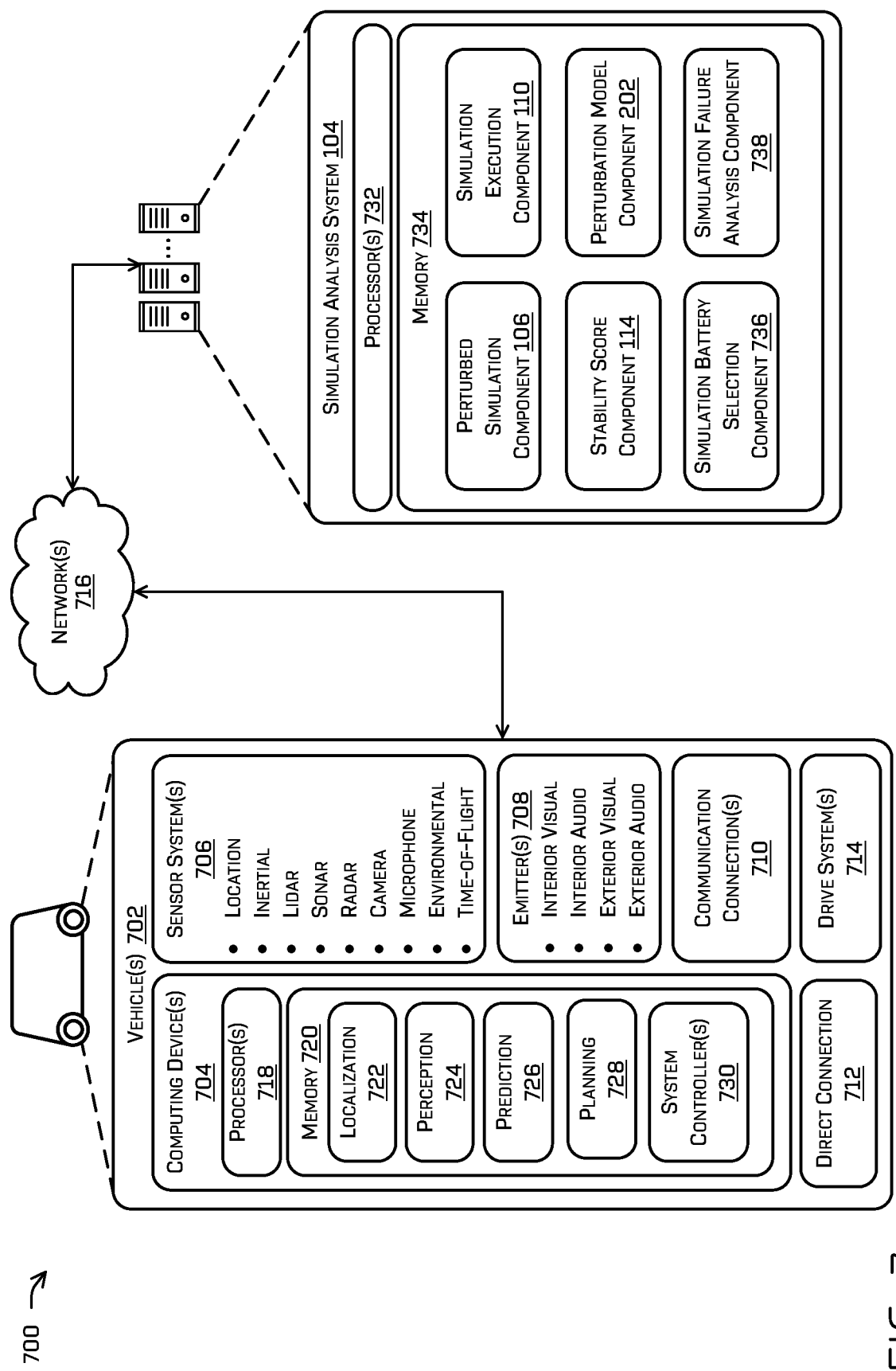
FIG. 7 depicts a block diagram of an example system for implementing the techniques described herein.

FIG. 7 depicts a block diagram of an example system 700 for implementing the techniques discussed herein. In at least one example, the system 700 can include one or more vehicle(s) 702. In some cases, the vehicle(s) 702 may be substantially similar or identical to the vehicle 118 described above, and in other cases the vehicle(s) 702 may be non-simulated vehicles configured to traverse physical environments. In the system 700, the vehicle(s) 702 is an autonomous vehicle: however, the vehicle(s) 702 can be any other type of vehicle (e.g., a driver-controlled vehicle that may provide an indication of whether it is safe to perform various maneuvers).

The vehicle(s) 702 can include a computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle(s) 702 to exchange data and/or to provide power), and one or more drive system(s) 714. The one or more sensor system(s) 706 can be configured to capture sensor data associated with an environment.

The sensor system(s) 706 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 706 can include multiple instances of each of these or other types of sensors. For instance, the time-of-flight sensors can include individual time-of-flight sensors located at the corners, front, back, sides, and/or top of the vehicle(s) 702. As another example, the camera sensors can include multiple cameras disposed at various locations about the exterior and/or interior of the vehicle(s) 702. The sensor system(s) 706 can provide input to the computing device(s) 704.

The vehicle(s) 702 can also include one or more emitter(s) 708 for emitting light and/or sound. The one or more emitter(s) 708 in this example include interior audio and visual emitters to communicate with passengers of the vehicle(s) 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle(s) 702 can also include one or more communication connection(s) 710 that enable communication between the vehicle(s) 702 and one or more other local or remote computing device(s) (e.g., a remote teleoperations computing device) or remote services. For instance, the communication connection(s) 710 can facilitate communication with other local computing device(s) on the vehicle(s) 702 and/or the drive system(s) 714. Also, the communication connection(s) 710 can allow the vehicle(s) 702 to communicate with other nearby computing device(s) (e.g., other nearby vehicles, traffic signals, etc.).

The communications connection(s) 710 can include physical and/or logical interfaces for connecting the computing device(s) 704 to another computing device or one or more external network(s) 716 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle(s) 702 can include one or more drive system(s) 714. In some examples, the vehicle(s) 702 can have a single drive system 714. In at least one example, if the vehicle(s) 702 has multiple drive systems 714, individual drive systems 714 can be positioned on opposite ends of the vehicle(s) 702 (e.g., the front and the rear, etc.). In at least one example, the drive system(s) 714 can include one or more sensor system(s) 706 to detect conditions of the drive system(s) 714 and/or the surroundings of the vehicle(s) 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle(s) 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also include one or more communication connection(s) that enable communication by the respective drive system with one or more other local or remote computing device(s).

The computing device(s) 704 can include one or more processor(s) 716 and memory 718 communicatively coupled with the one or more processor(s) 718. In the illustrated example, the memory 720 of the computing device(s) 704 stores a localization component 722, a perception component 724, a prediction component 726, a planning component 728, and one or more system controller(s) 730. Though depicted as residing in the memory 720 for illustrative purposes, it is contemplated that the localization component 722, the perception component 724, the prediction component 726, the planning component 728, and the one or more system controller(s) 730 can additionally, or alternatively, be accessible to the computing device(s) 704 (e.g., stored in a different component of vehicle(s) 702 and/or be accessible to the vehicle(s) 702 (e.g., stored remotely).

In memory 720 of the computing device(s) 704, the localization component 722 can include functionality to receive data from the sensor system(s) 706 to determine a position of the vehicle(s) 702. For example, the localization component 722 can include and/or request/receive a three-dimensional map of an environment and can continuously determine a location of the autonomous vehicle within the map. In some instances, the localization component 722 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 722 can provide data to various components of the vehicle(s) 702 to determine an initial position of an autonomous vehicle for generating a trajectory, as discussed herein.

The perception component 724 can include functionality to perform object detection, segmentation, and/or classification. In some examples, the perception component 724 can provide processed sensor data that indicates a presence of an entity that is proximate to the vehicle(s) 702 and/or a classification of the entity as an entity type (e.g., car, pedestrian, cyclist, building, tree, road surface, curb, sidewalk, unknown, etc.). In additional and/or alternative examples, the perception component 724 can provide processed sensor data that indicates one or more characteristics (also referred to as parameters) associated with a detected entity and/or the environment in which the entity is positioned. In some examples, characteristics associated with an entity can include, but are not limited to, an x-position (global position), ay-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 724 can include functionality to store perception data generated by the perception component 724. In some instances, the perception component 724 can determine a track corresponding to an object that has been classified as an object type. For purposes of illustration only, the perception component 724, using sensor system(s) 706 can capture one or more images of an environment. The sensor system(s) 706 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 706, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 726 can generate one or more probability maps representing prediction probabilities of possible locations of one or more objects in an environment. For example, the prediction component 726 can generate one or more probability maps for vehicles, pedestrians, animals, and the like within a threshold distance from the vehicle(s) 702. In some instances, the prediction component 726 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 728 can determine a path for the vehicle(s) 702 to follow to traverse through an environment. For example, the planning component 728 can determine various routes and paths and various levels of detail. In some instances, the planning component 728 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 728 can generate an instruction for guiding the autonomous vehicle along at least a portion of the route from the first location to the second location. In at least one example, the planning component 728 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 728 can alternatively, or additionally, use data from the perception component 724 to determine a path for the vehicle(s) 702 to follow to traverse through an environment. For example, the planning component 728 can receive data from the perception component 724 regarding objects associated with an environment. Using this data, the planning component 728 can determine a route to travel from a first location (e.g., a current location) to a second location (e.g., a target location) to avoid objects in an environment. In at least some examples, such a planning component 728 may determine there is no such collision free path and, in turn, provide a path which brings vehicle(s) 702 to a safe stop avoiding all collisions and/or otherwise mitigating damage.

In at least one example, the computing device(s) 704 can include one or more system controller(s) 730, which can be configured to control steering, propulsion, braking, safety, emitters, communication, and other systems of the vehicle(s) 702. These system controller(s) 730 can communicate with and/or control corresponding systems of the drive system(s) 714 and/or other components of the vehicle(s) 702, which may be configured to operate in accordance with a path provided from the planning component 728.

The vehicle(s) 702 can connect to the simulation analysis system 104 via network(s) 714 and can include one or more processor(s) 732 and memory 734 communicatively coupled with the one or more processor(s) 732. In at least one instance, the one or more processor(s) 732 can be similar to the processor(s) 718 and the memory 734 can be similar to the memory 720. In the illustrated example, the memory 734 of the simulation analysis system 104 stores a perturbed simulation component 106, a simulation execution component 110, a stability score component 114, and a perturbation model 202, which may be substantially similar or identical to the corresponding components described above in reference to FIGS. 1-2. Additionally, the memory 734 in this example stores a simulation battery selection component 736 configured to construct batteries of simulation tests based on stability scores, as described above in reference to FIG. 5, and a simulation failure analysis component 738 configured to analyze and route simulation failures based on stability scores, as described above in reference to FIG. 6. Though depicted as residing in the memory 734 for illustrative purposes, it is contemplated that the perturbed simulation component 106, the simulation execution component 110, the stability score component 114, the perturbation model 202, the simulation battery selection component 736, and/or the simulation failure analysis component 738 can additionally, or alternatively, be accessible to the simulation analysis system 104 (e.g., stored in a different component of simulation analysis system 104 and/or be remotely accessible to the simulation analysis system 104).

The processor(s) 718 of the computing device(s) 704 and the processor(s) 732 of the simulation analysis system 104 can be any suitable processor capable of executing instructions to process data and perform operations as described herein. By way of example and not limitation, the processor(s) 718 and 732 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 720 computing device(s) 704 and the memory 734 of the simulation analysis system 104 are examples of non-transitory computer-readable media. The memory 720 and 734 can store an operating system and one or more software applications, instructions, programs, and/or data to implement the methods described herein and the functions attributed to the various systems. In various implementations, the memory 720 and 734 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 720 and 734 can be implemented as a neural network.

Example Clauses

A system comprising: one or more processors: and one or more computer-readable media storing computer-executable instructions that, when executed, cause the one or more processors to perform operations comprising: receiving a driving simulation configured to simulate operation of an autonomous vehicle system: determining a plurality of perturbed driving simulations based on the driving simulation, wherein each of the plurality of perturbed driving simulations includes at least one of a perturbed simulated object, a perturbed failure condition, or a perturbed vehicle control instruction of the autonomous vehicle system with respect to the driving simulation: executing each of the plurality of perturbed driving simulations: determining a first number of the plurality of perturbed driving simulations associated with a passing condition: determining a second number of the plurality of perturbed driving simulations associated with a failing condition: determining a simulation stability score associated with the driving simulation, based at least in part on the first number and the second number: and executing the driving simulation, based at least in part on the simulation stability score.

B. The system as recited in paragraph A, wherein the failing condition is indicative of a simulated vehicle operated in accordance with the autonomous vehicle system failing to traverse safely, the operations further comprising: transmitting data indicating the failing condition to an analysis system, based at least in part on the simulation stability score.

C. The system as recited in paragraph A, wherein executing the driving simulation comprises: determining to include the driving simulation within a battery of simulations, based at least in part on the simulation stability score: and executing the battery of simulations.

D. The system as recited in paragraph A, the operations further comprising: transmitting an indication of the simulation stability score to an autonomous vehicle, the autonomous vehicle configured to modify a driving behavior based at least in part on the stability score.

E. The system as recited in paragraph D, wherein determining the plurality of perturbed driving simulations comprises: receiving a score associated with a perturbation model: and determining a number of the plurality of perturbed driving simulations to be executed, based at least in part on the score associated with the perturbation model.

F. A method comprising: receiving a driving simulation configured to simulate operation of an autonomous vehicle system in response to a scenario in an environment; determining a perturbed driving simulation associated with the driving simulation: executing the perturbed driving simulation, the perturbed driving simulation comprising a perturbation to an element of the driving simulation: and determining, based at least in part on the perturbed driving simulation, a simulation stability score associated with the driving simulation, the simulation stability score indicative of a robustness of the driving simulation to changes to the autonomous vehicle system.

G. The method of paragraph F, further comprising: executing the driving simulation and receiving a response by the autonomous vehicle system to the driving simulation; determining a simulation failure based at least in part on the response: and transmitting data indicating the simulation failure to an analysis system, based at least in part on the simulation stability score.

H. The method of paragraph F, wherein determining of perturbed driving simulation comprises: applying a first perturbation value to a first attribute of a first simulated object in the driving simulation: and applying a second perturbation value to a second attribute of a second simulated object in the driving simulation.

I. The method of paragraph F, wherein the perturbed driving simulation comprises one of a plurality of perturbed driving simulations, and wherein determining the plurality of perturbed driving simulations comprises applying a perturbation value to a failure condition of the driving simulation.

J. The method of paragraph I, wherein determining the simulation stability score comprises determining a ratio of a number of perturbed driving simulations which, when executed, are associated with a passing condition with respect to a total number of perturbed driving simulations.

K. The method of paragraph J, wherein the passing condition is indicative of a simulated vehicle controlled by a simulated autonomous vehicle controller complies with control logic when executed in simulation.

L. The method of paragraph I, further comprising: determining a confidence interval associated with the plurality of perturbed driving simulations: and determining a number of the plurality of perturbed driving simulations to be executed, based at least in part on the confidence interval.

M. The method of paragraph F, further comprising: transmitting an indication of the scenario and the simulation stability score to an autonomous vehicle, the autonomous vehicle configured to modify a driving behavior based at least in part on the simulation stability score.

N. One or more non-transitory computer-readable media storing processor-executable instructions that, when executed by one or more processors, cause the one or more processors to perform operations comprising: receiving a driving simulation configured to simulate operation of an autonomous vehicle system in response to a scenario in an environment: determining a perturbed driving simulation associated with the driving simulation: executing the perturbed driving simulation, the perturbed driving simulation comprising a perturbation to an element of the driving simulation: and determining, based at least in part on the perturbed driving simulation, a simulation stability score associated with the driving simulation, the simulation stability score indicative of a robustness of the driving simulation to changes to the autonomous vehicle system.

O. The one or more non-transitory computer-readable media of paragraph N, the operations further comprising: executing the driving simulation and receiving a response by the autonomous vehicle system to the driving simulation: determining a simulation failure based at least in part on the response: and transmitting data indicating the simulation failure to an analysis system, based at least in part on the simulation stability score.

P. The one or more non-transitory computer-readable media of paragraph N, wherein determining of perturbed driving simulation comprises: applying a first perturbation value to a first attribute of a first simulated object in the driving simulation: and applying a second perturbation value to a second attribute of a second simulated object in the driving simulation.

Q. The one or more non-transitory computer-readable media of paragraph N, wherein the perturbed driving simulation comprises one of a plurality of perturbed driving simulations, and wherein determining the plurality of perturbed driving simulations comprises applying a perturbation value to a failure condition of the driving simulation.

R. The one or more non-transitory computer-readable media of paragraph Q, wherein determining the simulation stability score comprises determining a ratio of a number of perturbed driving simulations which, when executed, are associated with a passing condition with respect to a total number of perturbed driving simulations.

S. The one or more non-transitory computer-readable media of paragraph R, wherein the passing condition is indicative of a simulated vehicle controlled by a simulated autonomous vehicle controller complies with control logic when executed in simulation.

T. The one or more non-transitory computer-readable media of paragraph Q, the operations further comprising: determining a confidence interval associated with the plurality of perturbed driving simulations: and determining a number of the plurality of perturbed driving simulations to be executed, based at least in part on the confidence interval.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could." "may" or "might." unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more computer-readable media storing computer-executable instructions that, when executed, cause the one or more processors to perform operations comprising:

receiving an unperturbed driving simulation configured to simulate operation of an autonomous vehicle controller, the unperturbed driving simulation including a simulated environment and a simulated object within the simulated environment;

determining a plurality of perturbed driving simulations based on the unperturbed driving simulation, wherein determining each of the plurality of perturbed driving simulations includes:

determining a feature of the simulated object or the simulated environment; and perturbing the feature by a perturbation value;

executing each of the plurality of perturbed driving simulations;

determining a first number of the plurality of perturbed driving simulations associated with a passing simulation result;

determining a second number of the plurality of perturbed driving simulations associated with a failing simulation result;

determining a simulation stability score associated with the unperturbed driving simulation, based at least in part on the first number and the second number;

executing the unperturbed driving simulation to determine a unperturbed simulation result;
validating, based at least in part on the unperturbed simulation result and the simulation stability score, the autonomous vehicle controller; and
based at least in part on validating the autonomous vehicle controller, transmitting the autonomous vehicle controller to an autonomous vehicle.

2. The system as recited in claim 1, operations further comprising:
transmitting data indicating a failure of the unperturbed simulation to an analysis system, based at least in part on the unperturbed simulation result and the simulation stability score.

3. The system as recited in claim 1, wherein executing the unperturbed driving simulation comprises:
determining to include the unperturbed driving simulation within a battery of simulations, based at least in part on the simulation stability score; and
executing the battery of simulations.

4. The system as recited in claim 1, the operations further comprising:
transmitting an indication of the simulation stability score to an autonomous vehicle, the autonomous vehicle configured to modify a driving behavior based at least in part on the simulation stability score.

5. The system as recited in claim 4, wherein determining the plurality of perturbed driving simulations comprises:
receiving a score associated with a perturbation model; and
determining a number of the plurality of perturbed driving simulations to be executed, based at least in part on the score associated with the perturbation model.

6. A method comprising:
receiving an unperturbed driving simulation configured to simulate operation of an autonomous vehicle controller in response to a scenario, the unperturbed driving simulation including a simulated environment and a simulated object within the simulated environment;
executing the unperturbed driving simulation to determine a first simulation result;
determining a perturbed driving simulation associated with the unperturbed driving simulation, wherein determining the perturbed driving simulation comprises:
determining a feature of the simulated environment or the simulated object to perturb; and
perturbing the feature by a perturbation value;
executing the perturbed driving simulation to determine a second simulation result;
determining, based at least in part on the second simulation result, a simulation stability score associated with the unperturbed driving simulation; and
transmitting data indicating a simulation failure to an analysis system, based at least in part on the first simulation result and the simulation stability score.

7. The method of claim 6, wherein determining the perturbed driving simulation comprises:
applying the perturbation value to the feature of the simulated object in the unperturbed driving simulation; and
applying a second perturbation value to a second feature of a second simulated object in the unperturbed driving simulation.

8. The method of claim 6, wherein the perturbed driving simulation comprises one of a plurality of perturbed driving simulations.

9. The method of claim 8, wherein determining the simulation stability score comprises determining a ratio of a number of perturbed driving simulations which, when executed, are associated with a passing simulation result with respect to a total number of perturbed driving simulations.

10. The method of claim 9, wherein the passing simulation result is indicative that a simulated vehicle controlled by a simulated autonomous vehicle controller complies with control logic when executed in simulation.

11. The method of claim 8, further comprising:
determining a confidence interval associated with the plurality of perturbed driving simulations; and
determining a number of the plurality of perturbed driving simulations to be executed, based at least in part on the confidence interval.

12. The method of claim 6, further comprising:
transmitting an indication of the scenario and the simulation stability score to an autonomous vehicle, the autonomous vehicle configured to modify a driving behavior based at least in part on the simulation stability score.

13. The method of claim 6, wherein determining the perturbed driving simulation comprises perturbing at least one of:
the simulated environment;
the simulated object;
a failure condition of the unperturbed driving simulation; or
a vehicle control instruction of the autonomous vehicle controller.

14. The method of claim 6, wherein the simulation stability score indicates a level of uniformity between the unperturbed driving simulation and perturbed driving simulation.

15. One or more non-transitory computer-readable media storing processor-executable instructions that, when executed by one or more processors, cause the one or more processors to perform operations comprising:
receiving an unperturbed driving simulation configured to simulate operation of an autonomous vehicle controller in response to a scenario, the unperturbed driving simulation including a simulated environment and a simulated object within the simulated environment;
executing the unperturbed driving simulation to determine a first simulation result;
determining a perturbed driving simulation associated with the unperturbed driving simulation, wherein determining the perturbed driving simulation comprises:
determining a feature of the simulated environment or the simulated object to perturb; and
perturbing the feature by a perturbation value;
executing the perturbed driving simulation to determine a second simulation result;
determining, based at least in part on the second simulation result, a simulation stability score associated with the unperturbed driving simulation; and
transmitting data indicating a simulation failure to an analysis system, based at least in part on the first simulation result and the simulation stability score.

16. The one or more non-transitory computer-readable media of claim 15, wherein determining the perturbed driving simulation comprises:
applying the perturbation value to the feature of the simulated object in the unperturbed driving simulation; and applying a second perturbation value to a second feature of a second simulated object in the unperturbed driving simulation.

17. The one or more non-transitory computer-readable media of claim 15, wherein the perturbed driving simulation comprises one of a plurality of perturbed driving simulations.

18. The one or more non-transitory computer-readable media of claim 17, wherein determining the simulation stability score comprises determining a ratio of a number of perturbed driving simulations which, when executed, are associated with a passing simulation result with respect to a total number of perturbed driving simulations.

19. The one or more non-transitory computer-readable media of claim 18, wherein the passing simulation result is indicative that a simulated vehicle controlled by a simulated autonomous vehicle controller complies with control logic when executed in simulation.

20. The one or more non-transitory computer-readable media of claim 17, the operations further comprising:
  determining a confidence interval associated with the plurality of perturbed driving simulations; and
  determining a number of the plurality of perturbed driving simulations to be executed, based at least in part on the confidence interval.

* * * * *